United States Patent [19]

Terrado

[11] Patent Number: 4,855,008
[45] Date of Patent: Aug. 8, 1989

[54] EXPANDABLE TIRE BUILDING DRUM

[75] Inventor: Angel R. Terrado, Mersch, Luxembourg

[73] Assignee: The Goodyear Tire & Rubber Company, Akron, Ohio

[21] Appl. No.: 192,156

[22] Filed: May 9, 1988

[51] Int. Cl.⁴ ............................................. B29D 30/24
[52] U.S. Cl. ..................................... 156/401; 156/417
[58] Field of Search ............... 156/414, 415, 416, 417, 156/420, 400, 132, 401

[56] References Cited

U.S. PATENT DOCUMENTS

| 3,237,199 | 2/1966 | Brey | 156/415 X |
| 3,485,700 | 12/1969 | Cooper et al. | 156/420 X |
| 3,576,693 | 4/1971 | Pacciarini et al. | 156/417 |
| 3,644,162 | 2/1972 | Appleby et al. | 156/415 |
| 4,325,764 | 4/1982 | Appleby et al. | 156/123 |
| 4,683,021 | 7/1987 | Stalter et al. | 156/416 X |

FOREIGN PATENT DOCUMENTS

| 1337570 | 8/1963 | France | 156/415 |
| 52-73982 | 6/1977 | Japan | 156/415 |
| 1563342 | 3/1980 | United Kingdom . | |

Primary Examiner—Raymond Hoch
Attorney, Agent, or Firm—Frederick K. Lacher; T. P. Lewandowski

[57] ABSTRACT

A segmental drum (10) has a plurality of axially extending circumferentially spaced segments (36) with flexible connections (56) to shoulder pistons (32) at opposite ends of each segment (36). Wedge shaped bars (62) are positioned between the segments (36) and connected to center pistons (64) for urging tapered side faces (80) of the bars (62) into engagement with sloping side faces (78) of the segments (36). Elastic turnup bladders (42) are positioned outward of the segments (36) with nose portions (40) overlapping the ends of the segments (36) for resiliently returning the segments (36) and bars (62) to a retracted condition after expansion by radially outward movement of the shoulder pistons (32) and center pistons (64).

5 Claims, 3 Drawing Sheets

EXPANDABLE TIRE BUILDING DRUM

This invention relates generally, as indicated, to an expandable tire building drum and especially to a first stage solid pocket drum for building a carcass of a radial tire. During the first stage operation, the tire reinforcing plies, beads and other components are assembled on the first stage drum and then the carcass is moved to another location where it is shaped and the belt and tread applied. In the first stage assembly of the tire carcass it is important that the tire components be applied to contracted and expanded drum surfaces which are concentric and of uniform diameter along the length of the drum. Expandible drums of different constructions have been used heretofore; however it has been difficult to maintain a concentric drum surface and a uniform diameter along the length of the drum in both the expanded and contracted condition of the drum. For example, the drum surface may be concentric and uniform in the contracted condition but is distorted during expansion to a larger diameter. As a result, the components added to the carcass on the expanded drum are not precisely assembled which may adversely affect the uniformity of the tire.

The present invention is directed to an expandable drum construction in which expandable segments and bars between the segments provide a drum surface which is concentric and uniform along the length of the drum in the contracted and expanded condition. This is accomplished without a center sleeve and without distortion of the drum segments. Flexible mounting of the segments and a wedging of the bars between the segments compensate for the change in diameter of the drum. At the same time the stability and concentricity of the drum surface is maintained. As a result, tire carcasses may be built on the drum of this invention which are uniform and of high quality.

In accordance with an aspect of this invention there is provided a radially expandable tire building drum comprising a main shaft rotatably mounted on a supporting structure, a pair of shoulder assemblies positioned on opposite sides and spaced from a centerplane of the main shaft, a plurality of circumferentially spaced drum segments mounted on the shoulder assemblies, a pair of turnup bladders mounted on the shoulder assemblies outboard of the drum segments with nose portions overlapping ends of the segments, drum bars positioned between the sides of adjacent segments, the shoulder assemblies including shoulder expanding means connected to the ends of the drum segments for expanding the segments in a radial direction, drum bar expanding means mounted on the main shaft at the centerplane of the shaft and connected to the drum bars for urging the bars radially outward and drum bar retaining means in cooperation with the drum segments for retaining the drum bars in spaces between the drum segments.

To acquaint persons skilled in the arts most closely related to the present invention, a certain preferred embodiment thereof illustrating a best mode now contemplated for putting the invention into practice is described herein by and with reference to the annexed drawings forming a part of the specification. The embodiment shown and described herein is illustrative and as will become apparent to those skilled in these arts can be modified in numerous ways within the spirit and scope of the invention defined in the claims hereof.

In the annexed drawings

Figure 1:
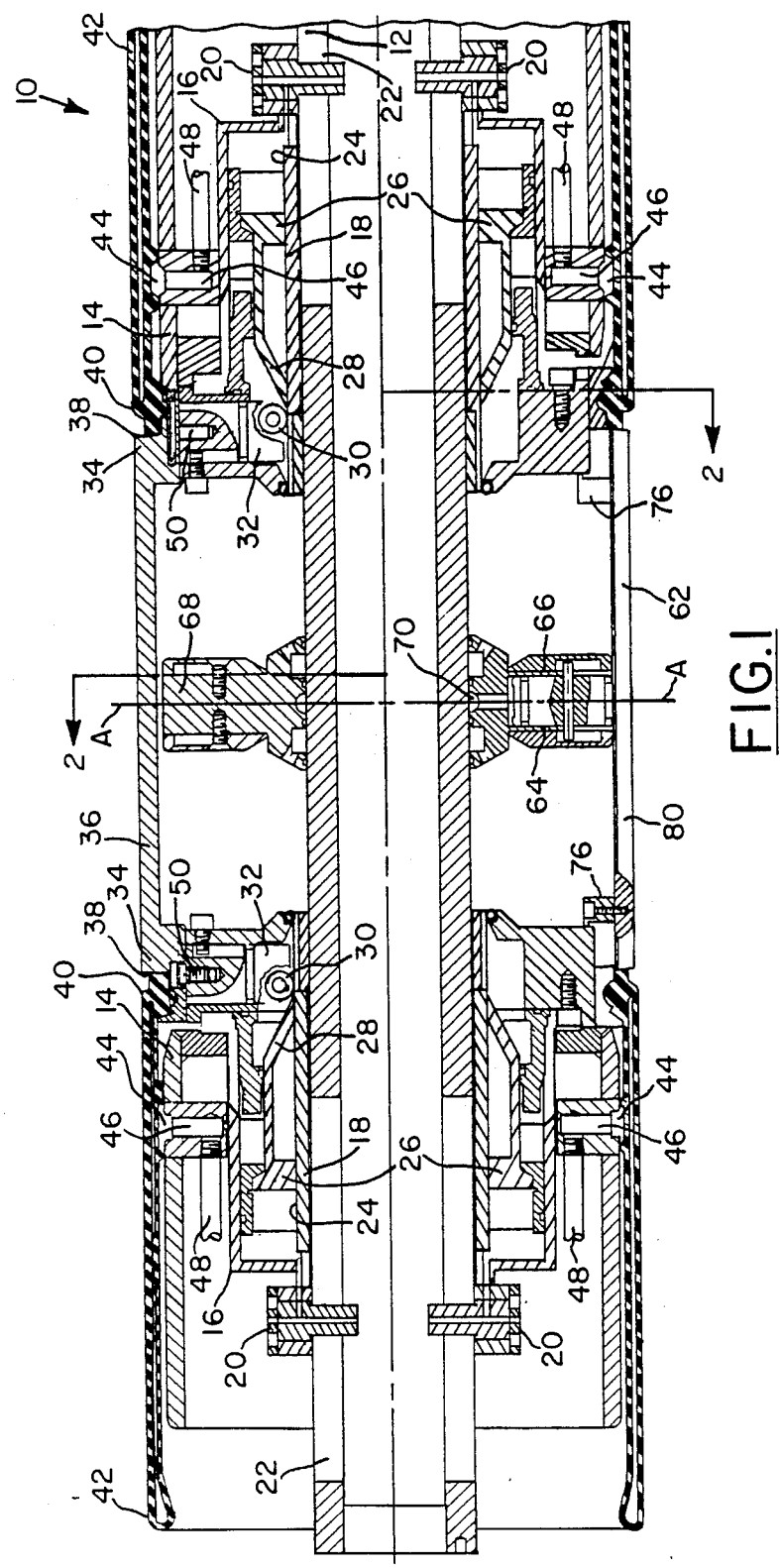
FIG. 1 is a fragmentary sectional view of the drum embodying the invention taken along line 1—1 in FIG. 2 with parts being broken away.
Figure 2:
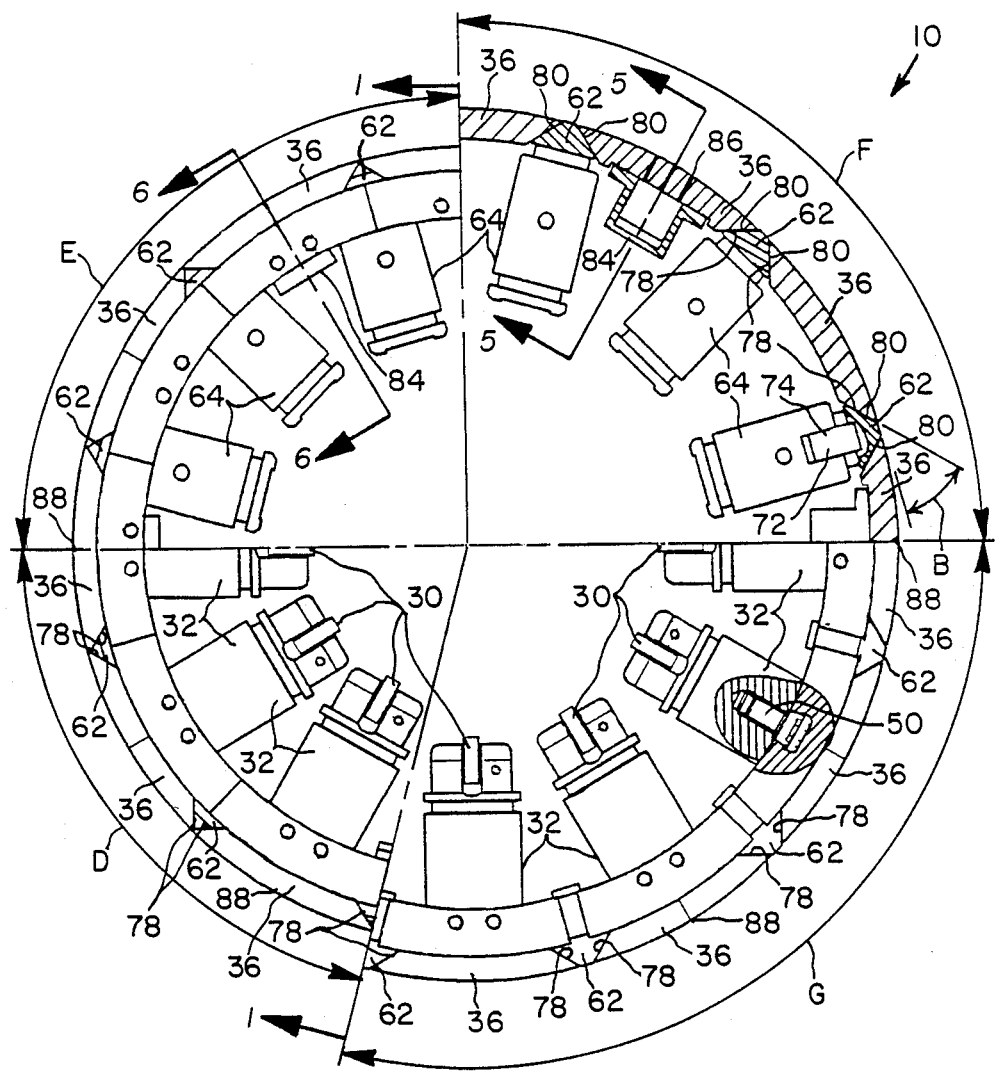
FIG. 2 is a fragmentary schematic end view, partly in section, of the drum shown in FIG. 1 showing the positions of the shoulder pistons and center pistons with the drum in the expanded and contracted conditions, parts being broken away.

Referring to FIGS. 1 and 2 a radially expandable tire building drum 10 is shown having a main shaft 12 which may be rotatably mounted on a supporting structure such as a housing (not shown). The main shaft 12 may have a centerplane A—A which may also be the centerplane of the tire building drum 10. A pair of shoulder assemblies 14 are slidably mounted on the main shaft 12 at positions spaced from the centerplane A—A on opposite sides of the centerplane. Each of the shoulder assemblies 14 has a housing 16 with a cylindrical base 18 having holddown bolts 20 extending through slots 22 in the main shaft 12 for fixing the housing 16 on the main shaft so that the shoulder assemblies 14 are spaced the desired distance from the centerplane A—A.

Each housing 16 has a cylinder 24 containing a piston 26 connected to a conical cam 28 for engaging a cam roller 30 on each of a plurality of shoulder pistons 32. The shoulder pistons 32 are mounted in circumferentially spaced, radially extending slots in the housing 16. Each of the shoulder pistons 32 is connected to an end portion 34 of a drum segment 36 extending axially of the drum 10 between the shoulder assemblies 14 at circumferentially spaced positions. Each end portion 34 has a bladder slot 38 for receiving a nose portion 40 of a turnup bladder 42 of resilient rubberlike material. The turnup bladder 42 may be inflatable and have ports 44 in communication with an inlet pipe 46 in each housing 16 which may be in communication with a source of air pressure through a conduit 48.

Figure 3:
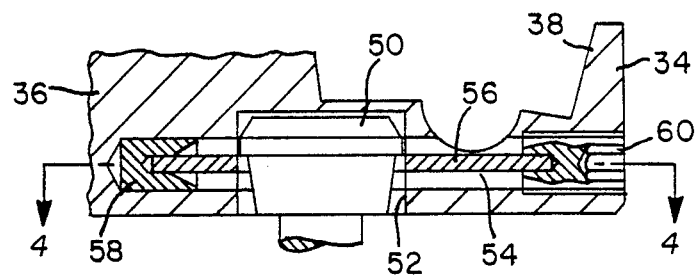
FIG. 3 is an enlarged fragmentary sectional view of a drum segment end showing the flexible connection to one of the shoulder assemblies taken along line 1—1 in FIG. 4.
Figure 4:
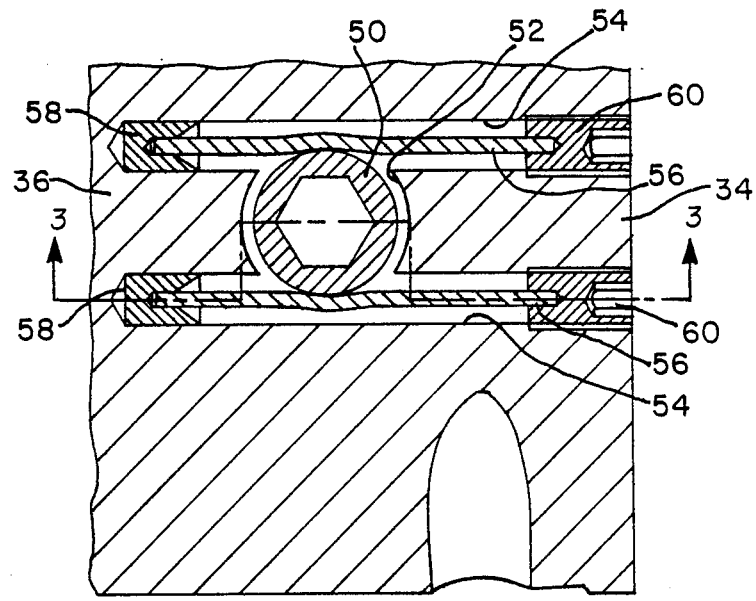
FIG. 4 is a fragmentary sectional view of the drum segment end taken along line 4—4 in FIG. 3.

Referring to FIGS. 3 and 4, the flexible connection of the drum segment 36 with the housing 16 of the shoulder assemblies 14 is illustrated. A bolt 50 is threaded in each of the shoulder pistons 32 and the bolt head is positioned in a recess 52 in the end portion 34 of the drum segment 36. At each side of the recess 52 there is provided an elongated hole 54 for a spring wire 56 engageable with the bolt head of the bolt 50. Each spring wire 56 may be mounted in a plug 58 at one end and a screw 60 at the other end. The length of the spring wire 56 is such that it may deflect without permanent deformation and thereby provide a floating connection between the drum segment 36 and housing 16.

Between each drum segment 36 and the adjacent drum segment is positioned a drum bar 62 connected to a center piston 64 positioned in a center cylinder 66 supported on a circumferentially extending flange 68 mounted on the main shaft 12 at the centerplane A—A. The center cylinder 66 may be in communication with a fluid pressure passage such as channel 70 in the flange 68 which may in turn be connected to a suitable source of fluid pressure such as air pressure. Each drum bar 62 has a pin 72 at the midpoint which fits in a slot 74 in the center piston 64. Also guide pins 76 may be provided at the ends of each drum bar 62 for engagement with the housing 16 of each of the shoulder assemblies 14.

As shown in FIG. 2, each drum segment 36 has sloping side faces 78 for engagement with tapered side faces 80 of each drum bar 62 adjacent the drum segment. The tapered side faces 80 extend along the sloping side faces 78 for substantially the entire length of the drum segment 36 providing a stabilizing wedging effect between each adjacent drum segment and drum bar 62. The angle between a plane tangential to the drum surface and a plane extending between the sloping side faces 78 and tapered side faces 80 may be varied; however, as shown by letter B in FIG. 2 is around 45 degrees for this embodiment.

Figure 5:
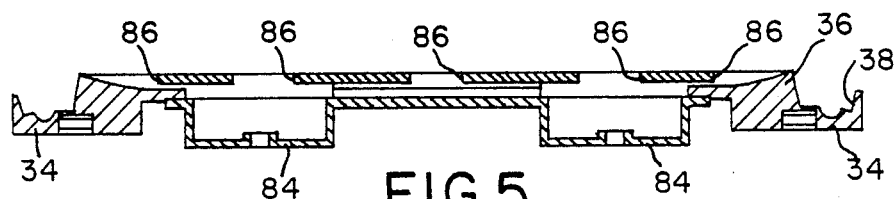
FIG. 5 is a sectional view of a stock pickup drum segment taken along line 5—5 in FIG. 1.
Figure 6:
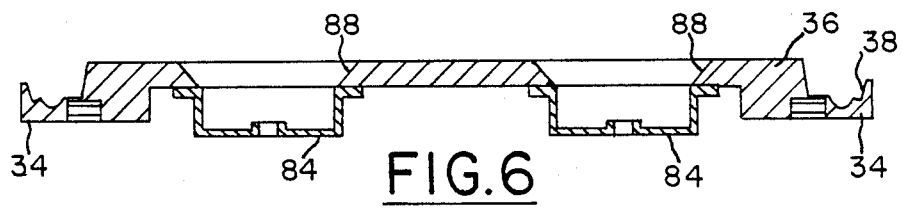
FIG. 6 is a sectional view of one of the stock holddown drum segments taken along line 6—6 in FIG. 1.

Referring to FIGS. 5 and 6, a source of vacuum (not shown) may be communicated to the drum segment 36 for picking up tire components from a suitable transfer device. In FIG. 5, the drum segment 36 has a pair of vacuum cups 84 opening on a vacuum chamber having a plurality of openings 86 positioned for gripping the tire component across the length of the drum segment 36. In FIG. 6, the drum segment 36 has the same pair of vacuum cups 84; however, these cups open directly onto a pair of holddown openings 88 for holding down the tire component after it is picked up and laid against the surface of the drum segment 36.

In operation the first tire components are applied to the tire building drum 10 in the contracted condition shown in FIG. 1 and in quadrants D and E of FIG. 2. The main shaft 12 is rotated to a predetermined position where the end of the component is applied to the drum surface at the drum segment 36 having the pickup openings 86, shown in FIG. 5. A vacuum is communicated to the vacuum cups 84 and openings 86 for gripping the end of the tire component after which the drum is rotated until the entire component is laid around the drum surface. This component is held in place by the vacuum communicated to the holddown openings 88 of each drum segment 36 containing these holddown openings, shown in FIG. 6. Other components may be applied including beads at the nose portion 40 of each turnup bladder 42. The drum 10 may be expanded by communicating air under pressure to each cylinder 24 in each housing 16 of the shoulder assemblies 14. This causes the cam 28 to move longitudinally toward the centerplane A—A lifting the cam roller 30 for each of the shoulder pistons radially expanding the drum surface by radially outward movement of each drum segment 36. Simultaneously, air pressure is communicated to the center cylinder 66 for each drum bar 62 causing the center piston 64 to move radially outward and wedging the drum bar between adjacent drum segments 36. This wedging action of the tapered side faces 80 of each drum bar 62 against the sloping side faces 78 of each drum segment 36 maintains the concentricity of the drum surface and uniformity of diameter along the length of the drum 10.

As the drum 10 expands, the flexible mounting of each drum segment 36 on each housing 16 of the shoulder assemblies 14 along with the wedging of each drum bar 62 between the adjacent drum segments compensates for the changing diameter while at the same time provides the support necessary for stability during the application of the tire components under pressure. As shown in FIGS. 3 and 4, each spring wire 56 of each end portion 34 grips the bolt head of the bolt 50 mounted on the housing 16 in a resilient manner providing a floating operation which is necessary with a drum 10 of this type.

After the drum 10 is expanded air pressure may be communicated to the turnup bladder 42 at each of the shoulder assemblies 14 for wrapping the tire components around the beads at the nose portion 40 of each turnup bladder 42 in a manner well known in the art. Each turnup bladder 42 may then be returned to the position shown in FIG. 1 and the drum 10 contracted by shifting from air pressure to vacuum in each cylinder 24 for each cam 28. Air is also released from each center cylinder 66 for each center piston 64. The resiliency of the turnup bladder 42, especially at the nose portion 40, will urge each drum segment 36 radially inward and cause each drum bar 62 to move radially inward due to the wedging action between the sloping side faces 78 of each drum segment 36 and the tapered side faces 80 of each drum bar 62.

Referring again to FIG. 2, the shoulder pistons 32 are shown in the retracted condition in quadrant D and in the expanded condition in quadrant G. Also the center pistons 64 are shown in the retracted condition in quadrant E and in the expanded condition in quadrant F. The center cylinders 66 and supporting members as well as the cam 28 and supporting members have not been shown for the purpose of illustrating the movement of the shoulder pistons 32 and the center piston 64 during the contracted and expanded conditions of the tire building drum 10.

While a certain representative embodiment and details have been shown for the purpose of illustrating the invention, it will be apparent to those skilled in the art that various changes and modifications may be made therein without departing from the spirit or scope of the invention.

What is claimed is:

1. A radially expandable tire building drum comprising a main shaft rotatably mounted on a supporting structure, a pair of shoulder assemblies positioned on opposite sides and spaced from a centerplane of said main shaft, a plurality of circumferentially spaced drum segments mounted on said shoulder assemblies, a pair of turnup bladders mounted on said shoulder assemblies outboard of said drum segments with nose portions overlapping ends of said drum segments, drum bars positioned between the sides of adjacent drums segments, said shoulder assemblies including shoulder pistons connected to the ends of said drum segments for expanding said drum segments in a radial direction, center pistons mounted on said main shaft at said centerplane of said shaft and positioned at circumferentially spaced positions around said main shaft, said center pistons being connected to said drum bars for urging said bars radially outward, tapered side faces on the sides of said drum bars and sloping side faces on the sides of said drum segments for engagement with said tapered side faces on both sides of said centerplane so that each of said drum bars will be wedged between said sloping side faces of adjacent drum segments for retaining said drum bars in spaces between said drum segments and stabilize the drum bars and drum segments.

2. A radially expandable tire building drum in accordance with claim 1 wherein the mounting of said drum segments on said shoulder pistons comprises flexible connections permitting adjustment movement of said drum segments relative to said shoulder pistons during expansion and contraction of said drum.

3. A radially expandable tire building drum in accordance with claim 1 including cam means engageable with said shoulder pistons for moving said pistons radially outward upon longitudinal movement of said cam means.

4. A radially expandable tire building drum in accordance with claim 3 including piston and cylinder assemblies connected to said cam means for moving said cam means longitudinally of said shaft for moving said shoulder pistons radially outward, said center pistons being slidably mounted in center cylinders and a source of fluid pressure in communication with said center cylinders and said piston and cylinder assemblies for simultaneous expansion of said center pistons and said shoulder pistons.

5. A radially expandable tire building drum in accordance with claim 4 including a center flange extending circumferentially around said main shaft at said centerplane of said shaft and said cylinders for said center pistons being mounted on said center flange at circumferentially spaced positions around said shaft.

* * * * *